United States Patent Office.

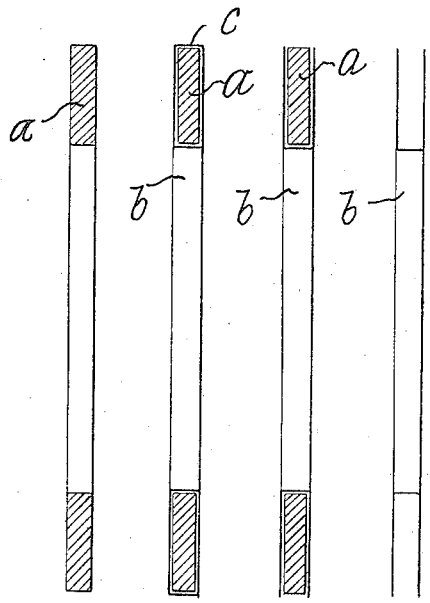

LEOPOLD HAUSLEHNER, OF VIENNA, AUSTRIA-HUNGARY, ASSIGNOR TO ISIDOR LANDAUER AND FERDINAND BLOCH, OF SAME PLACE.

PROCESS OF MANUFACTURING PACKING FOR FLANGES AND STUFFING-BOXES.

SPECIFICATION forming part of Letters Patent No. 680,860, dated August 20, 1901.

Application filed April 11, 1901. Serial No. 55,432. (No specimens.)

*To all whom it may concern:*

Be it known that I, LEOPOLD HAUSLEHNER, a subject of the Emperor of Austria-Hungary, residing at 12, Nobilegasse, Vienna XIV, in the Province of Lower Austria, in the Empire of Austria-Hungary, have invented certain new and useful Improvements in Processes of Manufacturing Packing for Flanges and Stuffing-Boxes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a process for the manufacture of a packing for flanges and stuffing-boxes, said packing being essentially composed of the packing material having an annular shape and provided with an envelop made of galvanically-precipitated metal.

This process has for its purpose to encompass as closely as possible the packing material with metal, in order to spare the packing material and to enable it to be used repeatedly after replacement of the metallic envelop, the material being merely held together by the envelop.

This process is characterized, essentially, by the fact that upon a mold corresponding in its shape with that of the annular packing material a galvanic precipitate of metal is produced, which precipitate is then removed from the outer circumference of the ring, whereupon the envelop is stripped off from the mold, which it covers on three sides, and this envelop is then slid upon the ring of packing material.

In the accompanying drawings, Figure 1 shows in cross-section a mold $a$ of a well-conducting metal or some other resisting material, which has the shape of the packing-ring to be produced. Upon this mold an envelop $b$ of metal, preferably of copper, is produced in a galvanic bath, as can be seen from Fig. 2. For permitting the removal of the envelop from the mold the outer part $c$ of the circumference is filed off, so that, as shown in Fig. 3, the mold remains within the metallic envelop, which is open on the outer edge and is U-shaped in section. The envelop is then stripped off from the mold, the inflections and crumples are smoothed by heating and hammering, and the metallic envelop thus obtained, which is represented independently in Fig. 4, is then slipped upon a ring $a$, made of packing material—such as lead, pasteboard, asbestos, &c.—the shape of this ring corresponding with that of the mold $a$, so that a packing-ring is obtained which has in cross-section the shape shown in Fig. 3. This metallic body may finally be cut or stamped on its circumference, according to the desired size and shape.

The thickness of the galvanic precipitate varies according to the particular requirements in respect of the durability of the packing-body.

The interior bridge connecting the two annular parts of the metallic envelop on their inner edge will vary in its height according to the desired thickness of the finished packing-ring.

I claim—

The process, which consists in forming upon an annular mold a deposit of a metal softer than iron, removing the deposit from the periphery of the mold, stripping the metallic sheath thus obtained from said mold and filling the sheath with a packing material, for the purpose set forth.

In testimony that I claim the foregoing as my invention I have signed my name in presence of two subscribing witnesses.

LEOPOLD HAUSLEHNER.

Witnesses:
 JOSEF RUBRARCH,
 ALVESTO S. HOGUE.